United States Patent [19]

Welch

[11] Patent Number: 4,880,667

[45] Date of Patent: Nov. 14, 1989

[54] PHOTOCHROMIC PLASTIC ARTICLE AND METHOD FOR PREPARING SAME

[75] Inventor: Cletus N. Welch, Clinton, Ohio

[73] Assignee: PPG Industries, Inc., Pittsburgh, Pa.

[21] Appl. No.: 110,636

[22] Filed: Oct. 15, 1987

Related U.S. Application Data

[63] Continuation of Ser. No. 779,750, Sep. 24, 1985, abandoned, which is a continuation-in-part of Ser. No. 717,618, Mar. 29, 1985, abandoned.

[51] Int. Cl.$^4$ .................. B05D 5/00; B05D 5/06; D06D 5/00

[52] U.S. Cl. ................. 427/160; 8/471; 8/507; 8/509; 8/514; 8/519; 427/164; 427/322; 427/333; 427/336; 427/255.6; 427/393.5; 427/412.2; 427/412.3; 427/412.5

[58] Field of Search ........... 427/160, 164, 322, 336, 427/255.6, 393.5, 333, 412.2, 412.3, 412.5; 8/471, 507, 509, 512, 514, 519

[56] References Cited

U.S. PATENT DOCUMENTS

| | | | |
|---|---|---|---|
| 3,239,366 | 3/1966 | Miller et al. | 117/36.1 |
| 3,519,635 | 7/1970 | Smith et al. | 252/300 |
| 3,625,731 | 12/1971 | Taylor | 117/38 |
| 3,679,351 | 7/1972 | Weissbein et al. | 8/50 |
| 3,707,347 | 12/1972 | Mueller | 8/4 |
| 4,043,637 | 8/1977 | Hovey | 350/160 P |
| 4,257,692 | 3/1981 | LeNaour-Senc | 8/471 |
| 4,342,668 | 8/1982 | Hovey et al. | 252/586 |
| 4,395,263 | 7/1983 | Davis | 8/471 |

FOREIGN PATENT DOCUMENTS

| | | |
|---|---|---|
| 141407 | 2/1984 | European Pat. Off. . |
| 2632418 | 2/1977 | Fed. Rep. of Germany . |
| 47-36420 | 9/1972 | Japan . |
| 50-10487 | 4/1975 | Japan . |

OTHER PUBLICATIONS

Perry's Chemical Engineers' Handbook, 4th ed., McGraw-Hill, N.Y., 1963, pp. 17–24.

*Primary Examiner*—Janyce Bell
*Attorney, Agent, or Firm*—Irwin M. Stein

[57] ABSTRACT

Described is a method for imparting a photochromic response to a synthetic plastic article, e.g., an optical lens such as a sunglass lens prepared from an allyl diglycol carbonate monomer. The method described comprises depositing a thin uniform substantially dry film of a photochromic-bearing polymeric resin onto at least one planar surface of the synthetic plastic material, heating the plastic article and resin film substantially uniformly at temperatures near to but below the melting temperature of the photochromic substance for a time sufficient to transfer a photochromic amount of the photochromic material into the subsurface region of the plastic article, and thereafter removing the photochromic-lean resin film from the planar surface(s) of the plastic article.

31 Claims, No Drawings

PHOTOCHROMIC PLASTIC ARTICLE AND METHOD FOR PREPARING SAME

This application is a continuation of application Ser. No. 779,750, filed Sept. 24, 1985, now abandoned, which is a continuation-in-part of application Ser. No. 717,618, filed Mar. 29, 1985, now abandoned, of the same title.

DESCRIPTION OF THE INVENTION

The present invention relates to photochromic synthetic plastic articles, particularly, photochromic optical elements, such as lenses. More particularly, the present invention relates to a method for preparing photochromic synthetic plastic articles. Photochromism is a reversible phenomenon illustrated by a compound which, when exposed to ultraviolet irradiation, changes color and subsequently reverts to its original color or state upon removal of the initial source of ultraviolet irradiation. A compound illustrating this property is called a photochromic compound.

Several approaches have been used to incorporate photochromic compounds into a synthetic plastic host material. For example, U.S. Pat. No. 3,212,898 describes preparing a photosensitive composition by suspending a photochromic benzospiropyran in a preformed polyester resin. U.S. Pat. No. 3,666,352 describes a mercury thiocarbazone compound in a solidified plasticized vinyl chloride-vinyl acetate copolymer, which copolymer is laminated between two plastic or glass layers, thereby to form a photochromic sunglass lens.

U.S. Pat. No. 3,508,810 describes preparing a safety glass unit by incorporating a photochromic mercury dithizonate or benzospiropyran compound into the polyvinyl butyral film sealed between the two glass plates of the unit. In one embodiment, a glass plate is coated with the photochromic benzospiropyran compound and the polyvinyl butyral plastic film placed over th photochromic coating. A second piece of glass is placed on top of the polyvinyl butyral film and the composite structure cured in an autoclave at 275° F. (135° C.) and a pressure of 150 pounds per square inch gauge (1034 kPa). Similarly, U.S. Pat. No. 3,522,143 describes milling or mixing a photochromic metal dithizonate compound into the film before sheeting or applying the photochromic compound as a coating onto one of the surfaces of the film to provide a material suitable for use as a lamina or interlayer in a laminated safety glass unit.

U.S. Pat. No. 4,173,672 describes a decorated safety glass comprising two glass sheets joined by a decorated film of a thermoplastic polymer, e.g., a polyvinyl butyral film. The thermoplastic polymer is decorated by transferring a colored impression to it from a temporary cellulosic support sheet, e.g., a printed paper bearing a color impression formed of organic or inorganic colorants, by heat and pressure. Subsequently, the temporary cellulosic support sheet is removed and a second sheet of glass placed over the decorated thermoplastic film. The two glass sheets and the interposed decorated film is subjected to heat and pressure until the organic or inorganic colorant becomes impregnated into the interposed thermoplastic film.

U.S. Pat. No. 4,268,134 describes interposing a photochromic glass sheet between two layers of optically clear plastic to produce a light-weight laminated photochromic lens. U.S. Pat. No. 4,289,497 describes a gradient photochromic lens in which the photochromic material is imbibed into the synthetic plastic lens by immersion of the lens into a solution of the photochromic compound.

U.S. Pat. No. 4,286,957 utilizes the conventional "thermal transfer" technique to integrate a photochromic material into a synthetic organic polymer host material. In this technique, the photochromic compound is applied to the surface of the organic host and then heated at between 180° C. and 220° C. for from 30 to 45 seconds to integrate by thermal transfer the photochromic material into the host material. It appears from published melting ranges of several of the benzospiropyrans described in that patent that the reported heating temperatures of 180° C.–220° C. is above the melting temperature of such benzospiropyran material.

The present invention resides in the discovery of a combination of process steps that yield an expedient method for incorporating photochromic compound(s) into a synthethic plastic material. In an embodiment of this process, a relatively thin, substantially dry homogeneous film containing a photochromic substance dissolved in a carrier polymeric resin is applied to at least one surface of the synthetic plastic material. The photochromic substance is then incorporated into the plastic material by heating the resin film substantially uniformly at temperatures below the melting temperature of the photochromic substance. Subsequently, the resin film depleted of photochromic substance is removed from the surface of the plastic material.

The aforesaid method permits the preparation of photochromic plastic films, sheets and castings useful in optical applications such as sunglasses, ski goggles, visors, camera lenses, optical filters, lens blanks, automotive windshields and ophthalmic lenses. As used herein, the term "optical element" is meant to include lenses and transparencies.

DETAILED DESCRIPTION OF THE INVENTION

In accordance with an embodiment of the present process, a thin, substantially dry homogeneous film of polymeric organic resin having a photochromic substance, e.g., a spiro(indoline)-type photochromic compound, dissolved therein is applied to at least one principal surface, e.g., a substantially planar surface, of a synthetic plastic host material. The plastic material to which the film is applied may be substantially flat or may have some degree of curvature, such as the convex and/or concave surfaces of a lens. As used herein, the terms "principal surface" or "planar surface" are intended to refer to that surface or those surfaces (flat or curved) of the plastic host material other than the side corresponding to the thickness of the plastic host. Preferably, the film is applied to at least one and, more preferably, to both principal surfaces of a substantially flat, preformed synthetic plastic host material.

Application of the photochromic-containing resin film to the receptor surface is by a technique which produces a substantially dry, substantially mottle-free film or coating of substantially uniform thickness. By substantially mottle-free is meant that the film is substantially free of droplets, ridges, streaks, blotches, spots etc. of solidified resin produced by non-uniformity in film thickness or uneven solvent removal. The thickness of the film is not critical but will commonly be between about 0.5 and 3.0 mils (0.0005–0.003 inches), e.g., 1–2 mils. The film should be sufficiently thin to enable the photochromic substance to move from the film and permeate or diffuse readily into the interior of the plastic host material, thereby to produce a plastic article exhibiting a photochromic response, i.e., exhibiting a change in transmission upon exposure to ultraviolet irradiation, which change in transmission (color change) can be visualized. If the film is too thick, the temperature and time required to transfer a photochromic amount of photochromic substance to the plastic hose may be excessive and cause decomposition of the photochromic substance. Further, a relatively significant amount of the photochromic substance will remain in the thick film, which adds an adverse economic burden to the process by loss of the photochromic substance or by adding the cost of recovering it from the spent film.

The amount of photochromic material required to achieve a visual photochromic response in the plastic host, i.e., a photochromic amount, can vary and will generally depend upon the intensity of the color change desired upon ultraviolet irradiation of the treated plastic article and the photochromic material used. The greater the desired change in color intensity, the greater the amount of the photochromic material required. Typically, a photochromic response may be achieved when the amount of the photochromic material dispersed within the plastic host is from about 0.2 to 1 milligram per square inch, based on the area of one planar surface. Generally, the photochromic substance will be present in the resin solution in amounts of between about 1.0 and 5 weight percent, more commonly between about 1.5 and 3.5 weight percent. Expressed differently, the photochromic substance will, in a preferred embodiment, constitute between about 25 and 40 weight percent, more preferably between 30 and 35 weight percent, of the dried solid resin film. It is also contemplated that different surfaces or even different parts or portions of the same surface may have different film thicknesses and/or different concentrations of photochromic substances to thereby vary the intensity of the color change in different portions of the plastic host.

The polymeric resin used to form the film on the surface of the plastic host material serves as a solvent for the photochromic substance, e.g., a spiro(indoline)-type photochromic material such as a spiro(indoline)-naphthoxazine. The affinity between the carrier resin and photochromic substance, i.e., the solubility of the photochromic compound in the carrier resin, should preferably not be high but sufficient to form a homogeneous solution at the above-described concentrations, i.e., the photochromic compound should be only slightly to moderately soluble in the resin so as to permit ready removal of the photochromic compound from the resin film. If, for example, the photochromic substance is infinitely, i.e., highly, soluble in the resin, the driving force required to transfer the photochromic material to the plastic host would be higher than if the photochromic substance were slightly or moderately soluble in the resin. Further, the efficiency of the transfer, i.e., the amount of photochromic substance transferred (basis the total amount in the resin) would be lower. Moreover, increasing the temperature of transfer to attain higher transfer efficiencies may promote pyrolysis of the photochromic substance. The resin should, however, have sufficient affinity for the photochromic compound to achieve a concentration of the photochromic compound of, for example, from 25–40 weight percent in the dried resin film without crystallization or segregation of the photochromic compound in the dried film. If the photochromic compound is too insoluble in the resin, it will crystallize out of the resin and form localized concentrations or islands in the solid resin film, i.e., form a non-homogeneous coating. Such an occurrence results in a mottled film and the non-uniform transfer of photochromic compound into the plastic article, thereby resulting in the article exhibiting a non-uniform color density—a result which is undesirable. Similarly, the resin should not adhere strongly to the synthetic plastic host material to which it is applied so that it can be readily removed from the surface of the plastic without leaving any marks on the surface. The resin should also remain solid and not become liquid at the temperature at which the photochromic substance is transferred.

Examples of suitable polymeric resins that can be used to form the above-described film are: polyvinyl chloride, polyvinylacetate, polyurethanes, polyvinylbutyral, copolymers of vinyl chloride and vinyl acetate, copolymers of vinyl chloride and vinylidene chloride, polyvinyl propionate, cellulose acetate butyrate, polymerizates of the lower alkyl ($C_1$-$C_4$), e.g., methyl, ethyl, n-butyl and isobutyl, esters of acrylic and methacrylic acid such as polymethylacrylate, polymethylmethacrylate and polymethyl/butyl methacrylate and mixtures of polyvinyl chloride and the aforesaid polyacrylates, e.g., mixtures of from about 90 parts of polyvinyl chloride and 10 parts of polymethylmethacrylate to about 10 parts of polyvinyl chloride and 90 parts of polymethylmethacrylate.

The photochromic-containing resin is applied to the surface of the plastic host by means resulting in a substantially dry coating so as to obtain a substantially mottle-free coating. The photochromic-resin carrier medium generally comprises a solution of the photochromic-bearing resin in an organic solvent(s) that is readily volatile at ambient temperatures, e.g., room temperatures (20°–22° C.). Preferably, the solvent is colorless. The solution generally comprises between about 1 and 5 weight percent of the photochromic substance, between about 2 and 10 weight percent of the resin and between about 85 and 97 weight percent of solvent. Preferably, the solution comprises between about 1.5 and about 3.5 weight percent of the photochromic material, between about 3 and 7 weight percent of the resin and between about 89.5 and 95.5 percent of solvent.

Examples of readily volatile or vaporizable solvents include toluene, benzene, xylene, methylethylketone, methylisobutylketone, methylchloroform, acetonitrile, tetrahydrofuran, dioxane, cyclohexanone, ethyl acetate, propyl acetate, isopropyl acetate, isobutyl acetate, butyl acetate, methyl alcohol, ethyl alcohol, butanol, isopropanol, 2-methoxyethanol, acetone, and mixtures of such solvents. Preferably, the solvent is selected from toluene, methylethylketone, methylisobutylketone and mixtures of such solvents.

The solution of photochromic material, resin and solvent can be prepared by any convenient technique, e.g., by dissolving independently the resin and photochromic substance in appropriate solvents. The resulting two solutions can then be mixed to produce the solution of photochromic-bearing resin used to apply the coating to the surface of the plastic host.

The above-described solution of photochromic-bearing resin material is applied to at least one principal surface, e.g., a substantially flat surface, of the film-receiving surface of the plastic host by techniques known in the art that are suitable to produce a substantially mottle-free coating or film of substantially uniform thickness. Preferably, the solution is applied in such a manner that the resulting film is substantially dry as soon as it is formed, i.e., the readily vaporizable solvent is substantially volatilized as the resin is applied to the receptor surface of the plastic host, thereby leaving a substantially dry film. Application techniques that may be employed include spraying, brushing, spin-coating, dip coating and use of a draw-down blade or wire bar. Of the aforesaid techniques, spraying is preferred. Spraying allows for good solvent release from the atomized droplets of the solution which, in a preferred mode, has a viscosity of about 1 to 20, e.g., 5, centiposes. The viscosity of the spray solution will depend on its constituents and the amount of each used. More preferably, the viscosity of the solution is in the lower portion of the aforesaid range, e.g., 1 to 10 centiposes.

Spraying also permits the controlled application of a thin coating of substantially uniform thickness. Thickness and uniformity of the film can be controlled by the number of times the surface is sprayed and the shape of the spray exiting the spray gun. Preferably, from two to six coverages of the sprayed solution over the receptor surface are used in producing a relatively thin film of substantiallu uniform thickness and composition, i.e., a homogeneous film. The high surface area of the atomized solution achieved with the spray technique provides for ready evaporation of the solvent so that the film is substantially dry at the instant of application to the surface of the plastic host. This avoids the formation of droplets, streaks, blotches, spots or other imperfections when the applied film is still in liquid form.

Before applying the solution of photochromic-bearing resin to the plastic host, the surface of the plastic to which the resin is to be applied is preferably cleaned. Cleaning may be accomplished by washing the surface with an aqueous medium, e.g., soapy water, to remove dust and dirt; washing the surface with an organic solvent such as methylchloroform or methylethylketone to remove any orgaNic film present on the surface; and/or eliminating static charges that are present on the surface of the plastic material. EliminatiOn of static electricity can be accomplished by commercially available equipment which ionize the air above the surfaCe, thereby producing a conductive path which allows the static charge to drain off or otherwise be neutralized.

The surface of the plastic material to which the resin is applied should be receptive to imbibition of the photochromic substance during the heating step. If the receptor surface is not amenable to imbibition, it can be treated to permit improved diffusion of the photochromic substance into the subsurface of the plastic host, e.g., by physically or chemically etching the surface. A receptive surface can be achieved usually by undercuring slightly the plastic during its formation, or by addition of a plasticizer to the monomeric material(s) used to prepare the organic plastic host. Such techniques are conventional in the polymerization art.

Following application of the photochromic-bearing resin film to the surface(s) of the plastic host material, the substantially dry film is permitted to completely dry. Drying can be conveniently conducted at room temperature in air; but, other conditions of drying which avoid crystallization of the photochromic compound within the resin film may be used as the occasion warrants. Thereafter, the coated plastic article is heated substantially uniformly at temperatures below the melting temperature of the photochromic compound used.

Heating can be accomplished by any convenient technique which results in substantially uniform heating of the film and plastic host. Preferably, heating is accomplished in a conventional hot air recirculating oven, which allows for uniform heating and hence a constant driving force for transfer of the photochromic compound into the plastic host. Heating may also be accomplished in a vacuum or with use of an inert, e.g., nitrogen atmosphere.

The temperatures to which the coated plastic article is heated will vary and depend on the melting temperature and vapor pressure of the particular photochromic compound utilized as well as the softening temperature of the synthetic plastic article. Such temperatures should preferably be near to but below the melting temperature of the photochromic compound and below the softening temperature of the synthetic plastic article. Moreover, such temperatures, i.e., photochromic transfer or incorporation temperatures, should be such as to minimize decomposition (pyrolysis) of the photochromic compound. Hence, the transfer temperatures chosen are sufficient to raise the vapor pressure of the photochromic compound adequately to permit its transfer to the plastic host without significant decomposition to the compound and softening of the plastic host. As the melting temperatures and vapor pressures of photochromic compounds, e.g., spiro(indoline)-type photochromic compounds, will vary depending on the nature of the compound and its substituents, one temperature range applicable to all photochromic materials cannot be described. However, given the above requirements one skilled in the art can readily determine an appropriate temperature for heating the coated plastic article. Transfer temperatures of between about 5° C. and about 50° C., preferably between 5° C. and 10° C., less than the melting temperature of the photochromic compound are contemplated except where significant decomposition of the photochromic compound is experienced at such temperatures. Generally, temperatures contemplated for use in association with spiro(indoline)naphthoxazine and with spiro(indoline)pyrido benzoxazine photochromic compounds are between about 145° C. and about 160° C. More particularly, for the photochromic compounds: 1,3,3,5,6-pentamethyl-9'-methoxyspior[indolino-2,3'[3H]-naphtho[2,1-b][1,4]-oxazine]; 1,3,5,6-tetramethyl-3-ethylspiro[indoline-2,3'[3H]pyrido[3,2-f][1,4]-benzoxazine]; and 1,3,3,4,5-(or 1,3,3,5,6-)pentamethylspiro[indoline-2,3'[3H]pyrido[3,2-f][1,4]benzoxazine], temperatures of between about 145° C. and about 155° C., e.g., 150°-155° C., are contemplated.

The coated plastic article is maintained at the above-described transfer temperatures, for a time sufficient to allow a substantial portion, i.e., a photochromic amount, of the photochromic compound to diffuse into and penetrate beneath the surface of the plastic article. Typically, the heating period is from between about 15 minutes and about 60 minutes, usually between about 20 and about 45 minutes at the transfer temperatures. For the above-described photochromic benzoxazine compounds, heating for from 25 to 30 minutes is adequate.

The mechanism by which the photochromic compound transfers from the resin film adhered to the surface of the plastic host into the plastic host material has not been established with certainty. It is postulated that transfer may be accomplished by thermal diffusion, sublimation and condensation or a combination of the aforesaid mechanisms. Whatever the specific mechanism(s), the photochromic compiund permeates into the interior of the plastic substrate, usually into the subsurface regions thereof, and becomes permanently and solidly incorporated within the plastic host material. In this manner, a photochromic amount of the photochromic substance is transferred substantially uniformly into and across the planar surface of the plastic host.

Following transfer of the photochromic compound into the plastic article, the coated plastic is allowed to cool, e.g., to room temperature, and subsequently the residual resin film, its concentration of photochromic substance reduced is removed from the surface of the plastic host. Removal of the photochromic compound-depleted film may be accomplished by any suitable technique; preferably a technique that does not impair the optical quality of the surface of the plastic. Conveniently, the depleted film is stripped from the plastic substrate by contacting the film with a suitable organic solvent such as methylchloroform, trichloroethylene, methylethylketone, methylisobutylketone, methylethylketone-toluene mixture, or other solvents such as: acetone, ethylene dichloride, chloroform and chlorobenzenes. The same solvent used to prepare the photochromic-bearing resin solution may be used to remove the residual resin film.

A suitable method for contacting the film with organic solvent is in a vapor degreasing unit wherein the film is exposed to the vapors of the selected solvent(s) which condense on and run off the surface of the plastic material, thereby washing the photochromic-depleted resin film from the surface. Alternatively, the resin film can be removed by dipping the plastic substrate into a bath of the solvent, spraying the solvent of the film or physically stripping the film from the substrate.

After the photochromic compound-depleted or spent film has been removed from the surface of the plastic article, the surface can be washed with water or other suitable aqueous medium such as, for example, soap or detergent solutions and dried. If desired, the plastic article can be tinted with conventional disperse and soluble dyes used in the tinting of organic plastic materials using techniques well-known in the art, e.g., a conventional dye bath. Thereafter, the tinted plastic article is washed, e.g., with soapy water, and dried. Tinting of the plastic article can be performed immediately after removal of the spent resin film and before washing with the aqueous medium. Alternatively, tinting can be performed before the photochromic compound is applied.

Synthetic plastic host materials that may be utilized in the process of the present invention are solid, transparent polymerized organic materials. Preferably, the host material is an optically clear material, i.e., material suitable for ophthalmic or optical elements, such as ophthalmic lenses, or materials useful for such applications as windows, windshields, etc.

Examples of transparent host materials which may be used with the photochromic compounds of the present invention include: polymers and copolymers of polyol(allyl carbonate) monomers, polyacrylates, poly(alkylacrylates) such as polymethylmethacrylates, cellulose acetate, cellulose propionate, cellulose butyrate, cellulose triacetate, cellulose acetate propionate, cellulose acetate butyrate, poly(vinyl acetate), poly(vinyl alcohol), polyurethanes, polycarbonates, polyethyleneterephthalate, polystyrene, poly(styrene-methylmethacrylate) copolymer, poly(styrene-acrylonitrile) copolymers, polyvinyl pyrrolidone, poly-vinyl chloride, polyvinyl butyrate and polyvinylbutyral. Transparent blends of the transparent polymers and copolymers are also suitable as host materials. Preferably, the host material is an optically clear polymerized organic material prepared from a polycarbonate, such as poly(4,4'-dioxydiphenol-2,2-propane), which is sold under the trademark, LEXAN; a polyol(allyl carbonate), especially polymers of diethylene glycol bis(allyl carbonate), which is sold under the trademark, CR-39, and its copolymers with, for example, vinyl acetate, e.g., copolymers of from 80–90 percent diethylene glycol bis(allyl carbonate) and 10–20 percent vinyl acetate, particularly 80–85 percent of the bis(allyl carbonate) and 15–20 percent vinyl acetate; cellulose acetate, cellulose propionate, cellulose butyrate; polystyrene and its copolymers with methyl methacrylate, vinyl acetate and acrylonitrile, and cellulose acetate butyrate. Polymethylmethacrylate, such as the material sold under the trademark, PLEXIGLAS may also be used with photochromic substances having melting points less than about 140° C.

Polyol(allyl carbonate) monomers which may be polymerized to form a transparent host material are the allyl carbonates of linear or branched aliphatic or aromatic liquid polyols, e.g., aliphatic glycol bis(allyl carbonate) compounds or alkylidene bisphenol bis(allyl carbonate) compounds. These monomers can be described as unsaturated polycarbonates of polyols, e.g., glycols. The monomers can be prepared by procedures well known in the art, e.g., U.S. Pat. Nos. 2,370,567 and 2,403,113.

The polyol (allyl carbonate) monomers can be represented by the graphic formula:

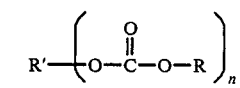  I wherein R is the radical derived from an unsaturated alcohol and is commonly an allyl or substituted allyl group, R' is the radical derived from the polyol, and n is a whole number from 2–5, preferably 2. The allyl group (R) can be substituted at the 2 position with a halogen, most notably chlorine or bromine, or an alkyl group containing from 1 to 4 carbon atoms, generally a methyl or ethyl group. The R group can be represented by the graphic formula:

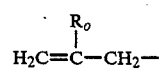  II wherein $R_o$ is hydrogen, halogen, or a $C_1$–$C_4$ alkyl group. Specific examples of R include the groups: allyl, 2-chloroallyl, 2-bromoallyl, 2-fluoroallyl, 2-methallyl, 2-ethylallyl, 2-isopropylallyl, 2-n-propylallyl, and 2-n-butylallyl. Most commonly, R is the allyl group, $H_2C=CH-CH_2-$.

R' is a polyvalent radical derived from the polyol, which can be an aliphatic or aromatic polyol that contains 2, 3, 4 or 5 hydroxy groups. Typically, the polyol contains 2 hydroxy groups, i.e., a glycol or bisphenol. The aliphatic polyol can be linear or branched and contain from 2 to 10 carbon atoms. Commonly, the aliphatic polyol is an alkylene glycol having from 2 to 4 carbon atoms or a poly($C_2$–$C_4$) alkylene glycol, i.e., ethylene glycol, propylene glycol, trimethylene glycol, tetramethylene glycol, or diethylene glycol, triethylene glycol, etc.

The aromatic polyol can be represented by the graphic formula:

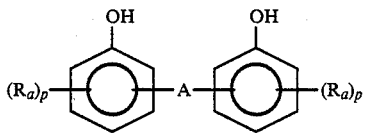

wherein A is a bivalent radical derived from an acyclic aliphatic hydrocarbon, e.g., an alkylene or alkylidene radical, having from 1 to 4 carbon atoms, e.g., methylene, ethylene, dimethylmethylene (isopropylidene), $R_a$ represents lower alkyl substituents of from 1 to 3 carbon atoms, and p is the integer 0, 1, 2, or 3. Preferably, the hydroxyl group is in the ortho or para position.

Specific examples of the radical R' include: alkylene groups containing from 2 to 10 carbon atoms such as ethylene ($-CH_2-CH_2-$), trimethylene, methylethylene, tetramethylene, ethylethylene, pentamethylene, hexamethylene, 2-methylhexamethylene, octamethylene, and decamethylene; alkylene ether groups such as $-CH_2-O-CH_2-$, $-CH_2CH_2-O-CH_2CH_2-$, $-CH_2-O-CH_2-CH_2-$, and $-CH_2CH_2-CH_2-O-CH_2CH_2CH_2-$; alkylene polyether groups such as $-CH_2CH_2-O-CH_2CH_2-O-CH_2CH_2-$ and $-CH_2CH_2CH_2-O-CH_2CH_2CH_2-O-CH_2CH_2CH_2-$; alkylene carbonate and alkylene ether carbonate groups such as $-CH_2CH_2-O-CO-O-CH_2CH_2-$ and $-CH_2CH_2-O-CH_2CH_2-O-CO-O-CH_2CH_2-O-CH_2CH_2-$; and isopropylidine bis(para-phenyl), i.e.,

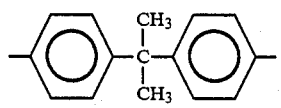

Most commonly, $R_1$ is $-CH_2CH_2-$, $-CH_2CH_2-O-CH_2CH_2-$, or $-CH_2CH_2-O-CH_2CH_2-$.

Specific examples of polyol (allyl carbonate) monomers include ethylene glycol bis(2-chloroallyl carbonate), ethylene glycol bis(allyl carbonate), diethylene glycol bis(2-methallyl carbonate), diethylene glycol bis(allyl cargonate), triethylene glycol bis(allyl carbonate), propylene glycol bis(2-ethylallyl carbonate), 1,3-propanediol bis(allyl carbonate), 1,3-butanediol bis(allyl carbonate), 1,4-butanediol bis(2-bromoallyl carbonate), dipropylene glycol bis(allyl carbonate), trimethylene glycol bis(2-ethylallyl carbonate), pentamethylene glycol bis(allyl carbonate), and isopropylidene bisphenol bis(allyl carbonate).

Industrially important polyol bis(allyl carbonate) monomers which can be utilized in the invention herein contemplated are:

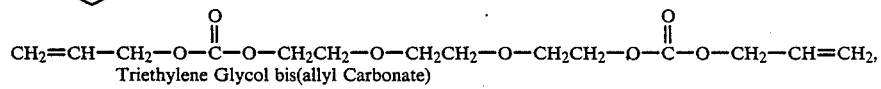
Triethylene Glycol bis(allyl Carbonate)

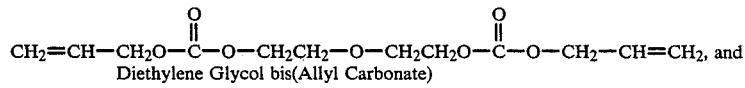
Diethylene Glycol bis(Allyl Carbonate)

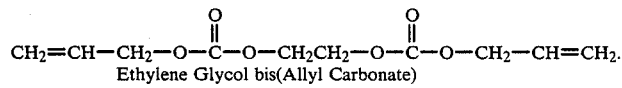
Ethylene Glycol bis(Allyl Carbonate)

Diethylene glycol bis(allyl carbonate) is preferred.

Because of the process by which the polyol(allyl carbonate) monomer is prepared, i.e., by phosgenation of the polyol (or allyl alcohol) and subsequent esterification by the allyl alcohol (or polyol) respectively, the monomer product can contain related species in which the moiety connecting the allyl carbonate groups contains one or more carbonate groups. These related species can be represented by the graphic formula:

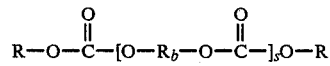

wherein R is as defined above, $R_b$ is a bivalent radical, e.g., alkylene or phenylene, derived from a diol, and s is a whole number from 2 to 5. The related species of diethylene glycol bis(allyl carbonate) can be represented by the graphic formula,

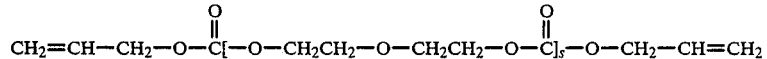

wherein s is a whole number from 2 to 5. The polyol (allyl carbonate) monomer can typically contain from 2 to 20 weight percent of the related species and such related species can be present as mixtures, i.e., mixtures of the species represented by s being equal to 2, 3, 4 etc.

Photochromic substances contemplated for use in the process of the present invention are compounds, including spiro(indoline)-type compounds, that provide a visual photocrhomic response, are moderately soluble in the above-described resin carrier, are soluble in the plastic host, and are readily transferrable to the plastic host from a film on its surface by the application of heat without significant decomposition at temperatures near to but below its melting temperature, as heretofore described. Particularly contemplated are spiro(indoline)pyrido benzoxazines, spiro(indoline)naphthoxazines, spiro(indoline)benzopyrans, spiro(indoline)naphthopyrans, spiro(indoline)quinopyrans, spiro(indoline)benzoxazines, spiro(indoline)pyridopyrans, and spiro-(indoline)pyridooxazines having a molecule weight less than 600, e.g., between about 250 and 450. Preferred are the aforesaid pyrido benzoxazines and naphthoxazines.

Spiro(indoline)pyrido benzoxazines contemplated herein may be represented by the following graphic formula:

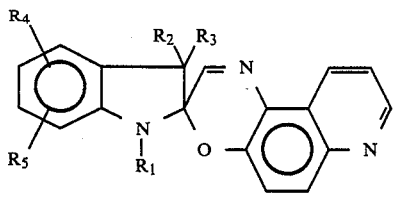

In the above graphic formula X, $R_1$ is selected from the group consisting of hydrogen, $C_1-C_8$ alkyl, e.g., methyl, ethyl, propyl, butyl, etc., phenyl, phen($C_1-C_4$)alkyl, allyl and mono- and di-substituted phenyl, said phenyl substituents being selected from $C_1-C_4$ alkyl and $C_1-C_5$ alkoxy, e.g., methoxy, propoxy, butoxy and pentoxy. Preferably, $R_1$ is hydrogen, a $C_1-C_4$ alkyl, phenyl or benzyl radical.

$R_2$ and $R_3$ of formula X are selected from the group consisting of hydrogen, $C_1-C_5$ alkyl, phenyl, mono- and di-substituted phenyl, benzyl or combine to form a cyclic ring selected from the group consisting of an alicyclic ring containing from 6 to 8 carbon atoms (including the spiro carbon atom), norbornyl and adamantyl. The phenyl substituents may be selected from $C_1-C_4$ alkyl and $C_1-C_5$ alkoxy radicals. Preferably, $R_2$ and $R_3$ are each selected from $C_1-C_5$ alkyl such as methyl and ethyl. When one of $R_2$ or $R_3$ is a tertiary alkyl radical, such as tertiary butyl or tertiary amyl, the other is preferably an alkyl radical other than a tertiary alkyl radical.

$R_4$ and $R_5$ in graphic formula X are each selected from the group consisting of hydrogen, $C_1-C_5$ alkyl, halogen, $C_1-C_5$ alkoxy, nitro, cyano, $C_1-C_4$ haloalkyl, $C_1-C_4$ polyhaloalkyl, and $C_1-C_8$ alkoxycarbonyl. $R_4$ and $R_5$ can be present on any two of the available carbon atoms of the indolino portion of the compound, i.e., on the 4, 5, 6, or 7 positions. Preferably, when the substituents are other than hydrogen, they are present at the 4 and 5, 5 and 6, 4 and 7 or 6 and 7 positions. While any halogen, i.e., chlorine, bromine, iodine and fluorine, may be used in respect to the halogen or haloalkyl substituents, chlorine, bromine and trifluoromethyl are preferred. Preferably, $R_4$ and $R_5$ are selected from the group consisting of hydrogen, $C_1-C_2$ alkyl, e.g., methyl and ethyl, chlorine, bromine, and $C_1-C_5$ alkoxy, e.g., methoxy and ethoxy.

Of particular interest, are photochromic compounds represented by graphic formula X wherein $R_1$ is a $C_1-C_4$ alkyl, such as methyl, ethyl, n-propyl, isopropyl, n-butyl, secondary butyl, isobutyl and tertiary butyl; $R_2$ and $R_3$ are each methyl, ethyl or phenyl; and $R_4$ and $R_5$ are each hydrogen, methyl, methoxy, or chloro.

The spiro(indoline)pyrido benzoxazines described above can be synthesized by reaction of the corresponding nitroso-hydroxy quinoline compound with the corresponding free indoline (Fischer's base) or indolium salt, e.g., the iodide salt, compound. The two precursor materials are refluxed in a suitable solvent such as toluene or isopropanol until the reaction is completed. A base, such as triethylamine, is present in the reaction medium when the indolium salt is used as the reactant. See, for example, European Patent Application 84/113167.5, which describes the aforesaid pyrido benzoxazines and their synthesis.

Examples of suitable spiro(indoline)pyrido benzoxazines include those in which $R_1$, $R_2$, $R_3$, $R_4$, and $R_5$ are the following:

TABLE I

| Compound | $R_1$ | $R_2$ | $R_3$ | $R_4$ | $R_5$ |
|---|---|---|---|---|---|
| 1 | $CH_3$ | $CH_3$ | $CH_3$ | H | H |
| 2 | $CH_3$ | $CH_3$ | $CH_3$ | $CH_3$ | $CH_3$ |
| 3 | $CH_3$ | $CH_3$ | $CH_3$ | $OCH_3$ | H |
| 4 | $CH_3$ | $CH_3$ | $CH_3$ | Cl | $CH_3$ |
| 5 | $CH_3$ | $CH_3$ | $C_2H_5$ | H | H |
| 6 | $CH_3$ | $CH_3$ | $C_2H_5$ | $CH_3$ | $CH_3$ |
| 7 | $CH_3$ | $C_2H_5$ | $C_2H_5$ | H | H |
| 8 | n-$C_4H_9$ | $CH_3$ | $C_2H_5$ | H | H |
| 9 | $CH_3$ | $CH_3$ | phenyl | H | H |
| 10 | $CH_3$ | phenyl | phenyl | H | H |
| 11 | $C_2H_5$ | $CH_3$ | $C_2H_5$ | $CH_3$ | $CH_3$ |
| 12 | n-$C_4H_9$ | $CH_3$ | $C_2H_5$ | $CH_3$ | $CH_3$ |

Compound 2 in Table I may be named 1,3,3,4,5-(or 1,3,3,5,6-) pentamethylspiro [indoline-2,3' [3H] pyrido [3,2-f] [1,4] benzoxazine]. Similarly, compound 6 in Table I may be named 1,3,5,6-tetramethyl-3-ethylspiro [indoline-2,3' [3H] pyrido [3,2-f] [1,4] benzoxazine]. Other compounds in Table I can be similarly named taking into account the different substituents.

Spiro(indoline)naphthoxazines contemplated herein may be represented by the following graphic formula:

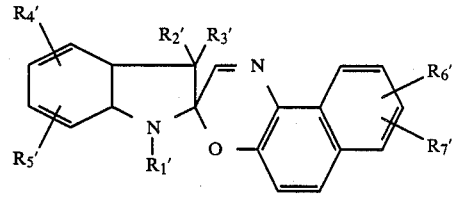

Spiro(indoline)naphthoxazines and their synthesis are described in, for example, U.S. Pat. Nos. 3,562,172, 3,578,602 and 4,215,010.

In graphic formula XI, $R_1'$ may be selected from hydrogen and $C_1-C_8$ alkyl, e.g., methyl, $R_2'$ and $R_3''$ may each be selected from hydrogen, $C_1-C_5$ alkyl, and phenyl, typically $C_1-C_2$ alkyl such as methyl and ethyl, $R_4'$ and $R_5'$ may each be selected from hydrogen, $C_1-C_5$ alkyl, halogen, e.g., chlorine or bromine, nitro, cyano, $C_1-C_5$ alkoxy and $C_1-C_5$ alkoxycarbonyl, and $R_6'$ and $R_7'$ may each be selected from hydrogen, halogen, e.g., chlorine and bromine, and $C_1-C_4$ alkoxy.

Specific examples of spiro(indoline)naphthoxazines contemplated herein, include those in which the substituents $R_1'-R_7'$ are the following:

TABLE II

| Compound | $R_1'$ | $R_2'$ | $R_3'$ | $R_4'$ | $R_5'$ | $R_6'$ | $R_7'$ |
|---|---|---|---|---|---|---|---|
| 1 | $CH_3$ | $CH_3$ | $CH_3$ | H | H | $OCH_3$ | H |
| 2 | $CH_3$ | $CH_3$ | $CH_3$ | $CH_3$ | $CH_3$ | $OCH_3$ | H |
| 3 | $CH_3$ | $CH_3$ | $CH_3$ | $OCH_3$ | H | $OCH_3$ | H |
| 4 | $CH_3$ | $CH_3$ | $CH_3$ | Cl | $CH_3$ | $OCH_3$ | H |
| 5 | $CH_3$ | $CH_3$ | $C_2H_5$ | H | H | $OCH_3$ | H |

TABLE II-continued

| Compound | $R_1'$ | $R_2'$ | $R_3'$ | $R_4'$ | $R_5'$ | $R_6'$ | $R_7'$ |
|---|---|---|---|---|---|---|---|
| 6 | $CH_3$ | $CH_3$ | $C_2H_5$ | $CH_3$ | $CH_3$ | $OCH_3$ | H |
| 7 | $CH_3$ | $C_2H_5$ | $C_2H_5$ | H | H | $OCH_3$ | H |
| 8 | $n\text{-}C_4H_9$ | $CH_3$ | $C_2H_5$ | H | H | $OCH_3$ | H |
| 9 | $CH_3$ | $CH_3$ | phenyl | H | H | $OCH_3$ | H |
| 10 | $CH_3$ | phenyl | phenyl | H | H | $OCH_3$ | H |
| 11 | $CH_3$ | $p\text{-}C_6H_4OCH_3$ | $p\text{-}C_6H_4OCH_3$ | H | H | $OCH_3$ | H |
| 12 | $C_2H_5$ | $CH_3$ | $C_2H_5$ | $CH_3$ | $CH_3$ | $OCH_3$ | H |
| 13 | $n\text{-}C_4H_9$ | $CH_3$ | $C_2H_5$ | $CH_3$ | $CH_3$ | $OCH_3$ | H |

Compound 2 in Table II may be named 1,3,3,5,6-pentamethyl-9'-methoxyspiro [indolino-2,3' [3H]-naphtho [2,1-b] 1,4]-oxazine]. Similarly, compound 6 in Table II may be named 1,3,5,6-tetramethyl-3-ethyl-9'-methoxyspiro [indolino-2,3' [3H]-naphtho [2,1-b][1,4]-oxazine]. Other compounds in Table II can be similarly named taking into account the different substituents.

Spiro(indoline)benzopyrans that are contemplated for use in the present invention include those represented by the following graphic formula:

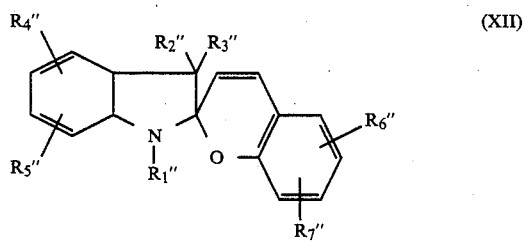

(XII)

Spiro(indoline)benzopyrans are known in the art. These benzopyrans and their synthesis are described in U.S. Pat. Nos. 3,100,778, 3,212,898 and 3,347,385 as well as in British Patent No. 1,418,089.

In graphic formula XII, $R_1''$ may be hydrogen or a $C_1\text{-}C_4$ alkyl, $R_2''$ and $R_3''$ may each be hydrogen, $C_1\text{-}C_5$ alkyl and phenyl, e.g., $C_1\text{-}C_2$ alkyl such as methyl and ethyl, $R_4''$ and $R_5''$ may each be hydrogen, halogen, e.g., chlorine or bromine, $C_1\text{-}C_4$ alkyl, nitro, cyano, and $C_1\text{-}C_4$ alkoxyl, and $R_6''$ and $R_7''$ may each be selected from hydrogen, $C_1\text{-}C_4$ alkoxy, nitro, phenyl, and halogen, e.g., chlorine or bromine.

Examples of spiro(indoline)benzopyrans include: 1,3,3-trimethyl-6'-nitro-spiro(2H-1-benzopyran-2,2'-indoline); 1,3,3-trimethyl-6'-nitro-8'-methoxy-spiro(2H-1-benzopyran-2,2'-indoline); 1,3,3-trimethyl-6'nitro-8'-bromo-spiro(2H-1benzopyran-2,2'-indoline); 1,3,3-trimethyl-5'-bromo-6'-nitro-8'-methoxy-spiro(2H-1-benzopyran-2,2'-indoline); 1,3,3-trimethyl-5-chloro-6'-nitro-spiro(2H-1-benzopyran-2,2'-indoline); and 1-phenyl-3,3-dimethyl-6'-nitro-spiro(2H-1-benzopyran-2,2'-indoline).

Spiro(indoline) naphthopyrans and spiro(indoline) quinopyrans may be represented by the following graphic formula XIII,

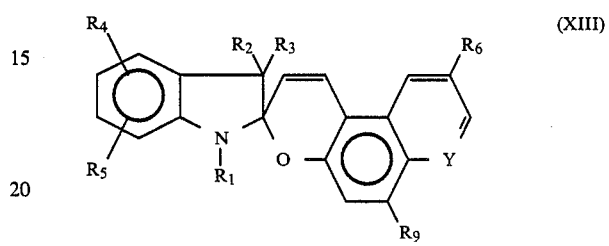

(XIII)

wherein $R_1$, $R_2$, $R_3$, $R_4$ and $R_5$ are as described with respect to graphic formula X, $R_6$ and $R_9$ may each be selected from hydrogen, $C_1\text{-}C_4$ alkyl, $C_1\text{-}C_4$ alkoxy, nitro, and halogen, e.g., chloro or bromo, and Y is carbon or nitrogen respectively.

Examples of spiro(indoline)naphthopyrans, include: 1,3,3-trimethyl spiro[indoline-2,2'-[2H]-naphtho[1,2-b]pyran]; 1,3,3,5,6-pentamethyl-spiro[indoline-2,2'-[2H]-naphtho[1,2-b[pyran]; 1,3,3-trimethyl-5-methoxy-spiro[indoline-2,2'-[2H]-naphtho[1,2-b]pyran]; 1,3,3-trimethyl-6'-chloro-spiro[indoline-2,2'-[2H]-naphtho[1,2-b]pyran]; and 1,3,3-trimethyl-6'-nitro-spiro[indoline-2,2'-[2H]-naphtho[1,2-b]pyran].

Examples of spiro(indoline)quinopyrans include: Spiro[2H-indole-2,3'-[3H]pyrano[3,2-f]quinoline; 1,3,3-trimethyl Spiro[2H-indole-2,3'-[3H]pyrano[3,2-f]quinoline; 1,3,3,5,6-pentamethyl Spiro[2H-indole-2,3'-[3H]pyrano[3,2-f]quinoline; 1,3,5,6-tetramethyl-3-ethyl Spiro[2H-indole-2,3'-[3H]pyrano[3,2-f]quinoline; 1,3,3-trimethyl-5-methoxy Spiro[2H-indole-2,3'-[3H]pyrano[3,2-f]quinoline; and 5-chloro-1,3,3,6'-tetramethyl Spiro[2H-indole-2,3'-[3H]pyrano]3,2-f]quinoline.

Spiro(indoline)-benzoxazines, -pyridopyrans, and -pyridooxazines may be represented by the following graphic formula XIV,

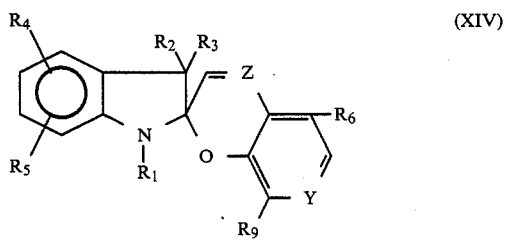

(XIV)

wherein $R_1$, $R_2$, $R_3$, $R_4$, and $R_5$ are as described with respect to graphic formula XIV, Z and Y are nitrogen and carbon, carbon and nitrogen, and nitrogen and nitrogen respectively, and $R_6$ and $R_9$ are as described with respect to graphic formula XIII.

In accordance with the present invention, a polymerizate of an organic plastic host material, such as a polymerizate of diethylene glycol bis(allyl carbonate), copolymers of diethylene glycol bis(allyl carbonate) and from 10–20 percent vinyl acetate, or polycarbonate, are degreased with an organic solvent such as methylethylketone to provide a clean surface. Static charges are eliminated from the cleaned surface by passing a high voltage discharge brush over the cleaned surface. A solution of a spiro(indoline)-type photochromic substance, such as a spiro(indoline)pyrido benzoxazine, and a polyvinylchloride resin in a readily volatile organic solvent is then applied to the cleaned and substantially static-free surface(s) of the plastic host, e.g., by spraying the solution onto the surface(s) thereby, to form a very thin, e.g., about 0.5 to 3 mils thick substantially dry coating or film of the polymeric resin containing from about 30 to 35 percent of the photochromic substance. The surface coated plastic host is then treated in a heating zone at temperatures below the melting temperature of the photochromic substance for between about 10 and 60 minutes to thereby transfer the photochromic substance from the polymeric resin coating into the subsurface region of the plastic host. After cooling, the photochromic-lean polymeric resin film is removed by contacting the film with an organic solvent, such as methylethylketone. The photochromic-treated plastic host is optionally tinted with a convenient dye which complements the color of the photochromic substance. Thereafter the surface is washed with soapy water to remove residues of dye and organic solvent and the article dried. The photochromic (and optionally tinted) treated plastic can then be formed into shapes such as lenses by known forming, e.g., thermoforming, techniques.

Thermoforming is a process wherein a flat lens is transformed into a concave shape by thermal treatment of the lens, e.g., a flat lens is placed on a female die, the geometry of which corresponds to a small circular segment of a sphere of a radius of, for instance, 9 centimeters and the lens is heated and pressed against said female die for several minutes.

The present process is more particularly described in the following examples which are intended as illustrative only since numerous modifications and variations therein will be apparent to those skilled in the art.

EXAMPLE

An air sprayable photochromic compound-containing solution was prepared by dissolving one part of the photochromic compound in 17 parts of methyl ethyl ketone and 17 parts of toluene. Two parts of a polyvinyl chloride resin (Strip Coat 2253 available from the 3M Company) were dissolved in 9 parts of about an 80/20 toluene-methyl isobutyl ketone mixture. The two resulting solutions were mixed and sprayed with a conventional air atomization spray gun on a 1 inch (2.54 cm) ×2 inch (5.08 cm) ×0.125 inch (0.32 cm) solid plastic coupon prepared from diethylene glycol bis(allyl carbonate). The solution was applied to the coupon using 4 successive coverages. All surface areas of the coupon received multiple coverages to achieve maximum film uniformity. The resulting film was substantially dry the instant it was applied to the coupon. The film was permitted to dry completely and the coated coupons heated in an air circulating oven for 20 minutes at 160° C. When cooled, the photochromic spent film was removed with either acetone or methyl ethyl ketone.

The coupons with the photochromic compound imbibed therein were irradiated with a Xenon high pressure arc lamp at an ultraviolet energy level of 3.0 milliwatts per square centimeter. The lamp was fitted with an OX-1 filter. The change in optical density ($\Delta OD$) was measured with a radiometer at 30 seconds illumination and at 4 minutes (saturation). Ultraviolet absorbance at 347 nanometers ($\lambda max$) wa also measured with a spectrophotometer.

These data are reported in Table III.

TABLE III

| PHOTOCHROMIC MATERIAL | | Ultraviolet Absorbence, | $\Delta OD$ | |
|---|---|---|---|---|
| Table | Compd. No. | at $\lambda Max$ | 30 sec. | Saturation |
| I | 1 | 2.60 | 0.46 | 0.73 |
| I* | 2 | 1.35 | 0.77 | 1.43 |
| I | 3 | 1.72 | 0.71 | 1.37 |
| I | 6 | 1.18 | 0.79 | 1.52 |
| I | 11 | 0.85 | 0.47 | 0.86 |
| I | 12 | 0.79 | 0.57 | 0.96 |
| II | 2 | 1.63 | 0.36 | 0.70 |
| II | 3 | 1.80 | 0.36 | 0.71 |
| II | 6 | 1.76 | 0.43 | 0.91 |
| II | 7 | 1.94 | 0.29 | 0.63 |
| II | 9 | 1.88 | 0.32 | 0.64 |
| II | 11 | 0.60 | 0.13 | 0.38 |
| II | 12 | 0.87 | 0.35 | 0.65 |
| II | 13 | 1.20 | 0.36 | 0.72 |

*2.5 parts of polyvinyl chloride resin used.

The data of Table III show that the described method is effective for incorporating photochromic compounds into a synthetic plastic host material.

While the above invention has been illustrated particularly with spiro(indoline) pyrido benzoxazine and spiro(indoline) naphthoxazine photochromic materials and the polymerizate of diethylene glycol bis(allyl carbonate) as the plastic host, it is expected that substantially similar results will be obtained by substituting other photochromic materials described herein for the aforesaid spiro(indoline)-type photochromic materials and other plastic host materials described herein for the polymerizate of diethylene glycol bis(allyl carbonate).

Although the present invention has been described with reference to specific details of certain embodiments thereof, it is not intended that such details should be regarded as limitations upon the scope of the invention except as and to the extent that they are included in the accompanying claims.

I claim:

1. A method for imparting a photochromic response to a synthetic plastic surface, which comprises:
    (a) applying a substantially mottle-free, substantially homogeneous film of polymeric resin having a spiro(indoline) photochromic material dissolved therein onto said surface, said film having a substantially uniform thickness across the portion of the surface to which it is applied and being substantially dry as soon as it is applied, said polymeric resin being a solvent for the photochromic material and remaining solid at the incorporation temperatures of step (b),
    (b) heating the film-bearing plastic surface at temperatures near to but below the melting temperature of the photochromic material for a time sufficient to incorporate a photochromic amount of the photochromic material into the subsurface of the synthetic plastic surface, and
    (c) thereafter removing the photochromic-lean film from said surface.

2. The method of claim 1 wherein the photochromic material constitutes between about 25 and 40 weight percent of the dry film applied to the synthetic plastic surface.

3. The method of claim 1 wherein the film is applied by spraying a solution of the photochromic material and polymeric resin in a readily volatile organic solvent onto the synthetic plastic surface.

4. The method of claim 3 wherein the solution has a viscosity of from about 1 to 20 centipoises.

5. The method of claim 1 wherein the synthetic plastic surface is cleaned and substantially free of static charges.

6. The method of claim 1 wherein the temperature at which the film-bearing plastic surface is heated is between about 5° C. and 50° C. less than the melting temperature of the photochromic material.

7. The method of claim 1 wherein the heating time is between about 15 minutes and 60 minutes.

8. The method of claim 1 wherein the photochromic-lean film is removed from the surface by contact with an organic solvent.

9. The method of claim 1 wherein the photochromic material is a spiro(indoline)pyrido benzoxazine or spir-(indoline)naphthoxazine.

10. The method of claim 1 wherein the synthetic plastic is selected from polymers and copolymers of polyol(allyl carbonate) monomers, polyacrylates, poly(alkyl acrylates), cellulose acetate, cellulose triacetate, cellulose acetate propionate, cellulose acetate butyrate, poly(vinyl acetate), poly(vinyl alcohol), polyurethanes, polycarbonates, polyethyleneterephthalate, polystyrene, poly (styrene-methylmethacrylate), poly (styrene-acrylonitrile) and polyvinylbutyral.

11. The method of claim 1 wherein the synthetic plastic is selected from polymers of diethylene glycol bis(allyl carbonate), copolymers of diethylene glycol bis(allyl carbonate) and vinyl acetate, polcarbonate, polyvinylbutyral, cellulose acetate, cellulose propionate, cellulose butyrate, cellulose acetate butyrate, polystyrene and copolymers of styrene with methyl methacrylate, vinyl acetate or acrylonitrile.

12. The method of claim 11 wherein the photochromic material is a spiro (indoline) pyrido benzoxazine or spiro (indoline) naphthoxazine.

13. The method of claim 12 wherein the synthetic plastic surface is undercured.

14. The method of claim 13 wherein the film is between about 0.5 and 3 mils thick.

15. The method of claim 14 wherein the photochromic material constitutes between about 25 and 40 weight percent of the dry film applied to the synthetic plastic surface.

16. The method of claim 14 wherein the film is applied by spraying a solution of the photochromic material and polymeric resin in a readily volatile organic solvent onto said synthetic plastic surface.

17. The method of claim 16 wherein the temperature at which the film-bearing plastic surface is heated is between about 5° C. and 50° C. less than the melting temperature of the photochromic material.

18. The method of claim 17 wherein the heating time is between about 15 minutes and 60 minutes.

19. The method of claim 17 wherein the temperature at which the film-bearing plastic surface is heated is between about 145° C. and 160° C.

20. The method of claim 18 which further comprises the step of tinting the plastic surface with a color complementary dye after the photochromic-lean film is removed from the surface.

21. The method of claim 18 wherein the plastic surface is tinted with a color complementary dye prior to applying the photochromic-bearing film to the surface.

22. The method of claim 1 wherein the film is between about 0.5 and 3 mils thick.

23. The method of claim 22 wherein the film is between about 1 and 2 mils thick.

24. The method of claim 22 wherein the film is applied by spraying a solution of the photochromic material and polymeric resin in a readily volatile organic solvent onto the synthetic plastic surface, said solution containing sufficient photochromic material to produce a dry film containing from 25 to 40 weight percent of photochromic material.

25. The method of claim 24 wherein the heating time is between 15 and 60 minutes at temperatures between 5° C. and 50° C. less than the melting temperature of the photochromic material.

26. The method of claim 1 wherein:
(a) the synthetic plastic is selected from polymers and copolymers of polyol (allyl carbonate) monomers, polyacrylates, poly(alkyl acrylates), cellulose acetate, cellulose triacetate, cellulose acetate propionate, cellulose acetate butyrate, poly(vinyl acetate) poly(vinyl alcohol), polyurethanes, polycarbonates, polyethyleneterephthalate, polystyrene, poly (styrene-methylmethacrylate), poly (styrene-acrylonitrile) and polyvinylbutyral.
(b) the photochromic material is selected from spiro-(indoline)pyrido benzoxazines, spiro(indoline)-naphthoxazines, spiro(indoline)benzopyrans, spiro-(indoline)naphthopyrans, spiro(indoline) quinopyrans, spiro(indoline)benzoxazines, spiro(indoline) pyridopyrans, and spiro(indoline) pyridooxazines; and
(c) the polymeric resin is selected from polyvinyl chloride, polyvinylacetate, polyurethanes, polyvinylbutyral, copolymers of vinyl chloride and vinyl acetate, copolymers of vinyl chloride and vinylidene chloride, polyvinyl propionate, cellulose acetate butyrate, polymerizates of $C_1$–$C_4$ esters of acrylic or methacrylic acid, and mixtures of polyvinyl chloride and said acrylate polymerizates, said mixtures containing from 10 to 90 parts of polyvinyl chloride and from 90 to 10 parts of acrylate polymerizates.

27. The method of claim 26 wherein:
(a) the synthetic plastic is selected from polymers of diethylene glycol bis(allyl carbonate), copolymers of diethylene glycol bis(allyl carbonate) and vinyl acetate, polycarbonate, polyvinylbutyral, cellulose acetate, cellulose propionate, cellulose butyrate, cellulose acetate butyrate, polystyrene and copolymers of styrene with methyl methacrylate, vinyl acetate or acrylonitrile,
(b) the photochromic material is selected from spiro-(indoline)pyrido benzoxazines and spiro-(indoline) naphthoxazines; and
(c) the polymeric resin is selected from polyvinyl chloride, polyvinyl acetate, polyvinyl butyral, copolymers of vinyl chloride and vinyl acetate, polyvinyl propionate, cellulose acetate butyrate, polymethylacrylate, polymethylmethacrylate and mixtures of polyvinyl chloride and said polyacrylates, said mixtures containing from 10 to 90 parts of polyvinyl chloride and from 90 to 10 parts of the polyacrylates.

28. The method of claim 27 wherein the film is applied by spraying a solution of the photochromic material and polymeric resin in a readily volatile organic solvent onto the synthetic plastic surface, said solution containing sufficient photochromic material to produce a dry film containing from 25 to 40 weight percent of photochromic materials.

29. The method of claim 28 wherein the temperature at which the film-bearing plastic surface is heated is between about 5° C. and 50° C. less than the melting temperatures of the photochromic material, and the heating time is between about 15 minutes and 60 minutes.

30. The method of claim 29 wherein the temperature and times at which the film-bearing plastic surface is heated is between 145° C. and 160° C. and between 20 minutes and 45 minutes respectively.

31. The method of claim 27 wherein the synthetic plastic surface is undercured.

* * * * *